United States Patent
Yuan et al.

(10) Patent No.: US 12,492,446 B2
(45) Date of Patent: Dec. 9, 2025

(54) SYSTEM FOR TREATING TIN SMELTING INTERMEDIATE MATERIALS AND METHOD FOR TREATING SAME

(71) Applicants: Kunming University of Science and Technology, Kunming (CN); YUNNAN TIN CO. LTD. TIN BRANCH, Honghe (CN)

(72) Inventors: Haibin Yuan, Kunming (CN); Duzuo Tang, Kunming (CN); Bin Yang, Kunming (CN); Wanli Xu, Kunming (CN); Xingcheng Song, Kunming (CN); Yunhua Xie, Kunming (CN); Zhang Zhang, Kunming (CN); Zhiyin Zhang, Kunming (CN); Xiangyong Guo, Kunming (CN); Jun Liang, Kunming (CN); Yun Chen, Kunming (CN); Hongwu Jia, Kunming (CN); Yumei Zhang, Kunming (CN)

(73) Assignees: Kunming University of Science and Technology, Kunming (CN); YUNNAN TIN CO. LTD. TIN BRANCH, Honghe (CN)

( * ) Notice: Subject to any disclaimer, the term of this patent is extended or adjusted under 35 U.S.C. 154(b) by 909 days.

(21) Appl. No.: 17/693,324

(22) Filed: Mar. 12, 2022

(65) Prior Publication Data
US 2023/0111491 A1   Apr. 13, 2023

Related U.S. Application Data

(63) Continuation of application No. PCT/CN2022/075956, filed on Feb. 11, 2022.

(30) Foreign Application Priority Data

Oct. 9, 2021 (CN) .......................... 202111177102.7

(51) Int. Cl.
C22B 7/04 (2006.01)
C22B 7/02 (2006.01)
(Continued)

(52) U.S. Cl.
CPC .................. C22B 7/04 (2013.01); C22B 7/02 (2013.01); C22B 25/06 (2013.01); F27D 7/06 (2013.01);
(Continued)

(58) Field of Classification Search
CPC .. C22B 7/04; C22B 7/02; C22B 25/06; C22B 5/16; C22B 9/02; C22B 9/04;
(Continued)

(56) References Cited

FOREIGN PATENT DOCUMENTS

| CN | 110172593 | * | 8/2010 | ............. C22B 25/08 |
| CN | 111321301 | * | 6/2020 | ............. F27D 17/20 |

OTHER PUBLICATIONS

CN111321301, Song et al., System and Method for Efficiently Recovering Valuable Metals in Tin Secondary Raw Materials, Jun. 23, 2020 (Year: 2020).*

(Continued)

*Primary Examiner* — Jessee R Roe
*Assistant Examiner* — Michael Aboagye
(74) *Attorney, Agent, or Firm* — JEEN IP LAW, LLC

(57) ABSTRACT

A system for treating tin smelting intermediate materials and method for treating the materials is disclosed. The system includes a fuming furnace, an electric settling furnace, a lean slag water quenching pool, a matte ladle, a pulverized coal injection system, a flue gas treatment system and a secondary air supply system; the fuming furnace is connected with the electric settling furnace, the pulverized coal injection system, the flue gas treatment system and the secondary air supply system respectively; the electric settling furnace is also connected with the slag-lean water quenching pool and (Continued)

the matte ladle respectively. The system and method disclosed by the disclosure can efficiently classify, separate and recover tin from other materials, solve the problems of difficult sales and transportation of complex tin-containing smelting intermediate materials and economic loss of discounted sales, and transform hazardous wastes into value-added valuable materials for comprehensive recovery.

6 Claims, 2 Drawing Sheets

(51) Int. Cl.
  *C22B 25/06* (2006.01)
  *F27D 7/06* (2006.01)
  *F27D 17/00* (2025.01)
  *F27D 17/20* (2025.01)
  *F27D 17/30* (2025.01)
  *F27D 3/00* (2006.01)

(52) U.S. Cl.
  CPC ............ *F27D 17/20* (2025.01); *F27D 17/302* (2025.01); *F27D 2003/0034* (2013.01); *F27D 2007/066* (2013.01); *F27M 2001/10* (2013.01); *F27M 2003/13* (2013.01)

(58) Field of Classification Search
  CPC . C22B 25/02; F27D 7/06; F27D 17/20; F27D 17/302; F27D 2003/0034; F27D 2007/066; F27M 2001/10; F27M 2003/13
  USPC .................................... 266/190, 169; 75/432
  See application file for complete search history.

(56) References Cited

OTHER PUBLICATIONS

CN110172593, Song et al., An Energy-saving and Environment-friendly Tin Smelting System and Casting Technique, Aug. 27, 2019 (Year: 2019).*

* cited by examiner

SYSTEM FOR TREATING TIN SMELTING INTERMEDIATE MATERIALS AND METHOD FOR TREATING SAME

TECHNICAL FIELD

The present disclosure relates to the technical field of tin and copper recovery, in particular to a system for treating tin smelting intermediate materials and a method for treating the materials.

BACKGROUND ART

In the tin smelting production process, some valuable or harmful impurity elements are brought into the smelting process along with the accompanying tin concentrate, and are brought into the subsequent impurity removal process, thus various complex tin-containing hazardous waste materials are produced.

At present, the main production process equipment of tin concentrate smelting at home and abroad include Osmet top-blown converter, coarse tin mixing pot, tin electric settling furnace, fluidized bed furnace, fuming furnace, electrothermal continuous crystallizer, vacuum furnace, tin electrolyzer system, etc. After the tin concentrate is smelted in the Osmet top-blown converter, the crude tin produced is sent to the demixing pot, and various tin-containing materials are produced after several times of demixing. Wherein, the copper slag containing tin and sulfur produced by copper removal is a hazardous waste material. According to the current national environmental management measures, the sales and transportation of the material are relatively strict and standardized, and the material must be sold to the lower level at a discount, which will also bring the loss of operating profit to the tin smelting enterprises; In addition, with the deep deimpurity of the subsequent coarse tin, a certain amount of tin-containing anode mud is generated in the tin electrolysis process, and the tin-containing anode mud is enriched with impurity elements antimony, bismuth, precious metals gold and silver, and also contains a certain amount of copper. At the same time, the grade of tin is also high, it is also a hazardous waste material, which is similar to the above-mentioned slag containing tin, sulfur and copper. If it is sold directly, it will also face the loss of profit caused by the low valuation coefficient.

In order to realize the above-mentioned complex tin-containing smelting intermediate material "dry-pressing," solve the problem of economic loss caused by the difficulty in sale and transportation of hazardous waste materials and low price coefficient, research and development of a low cost, high efficiency and environmental protection comprehensive recovery technology is a technical problem that the technicians of tin smelting face and need to solve urgently.

SUMMARY

In view of this, the present disclosure provides a system for treating tin smelting intermediate materials and a method for treating the materials, which can efficiently separate and recover tin from other materials by classification, solve the economic loss caused by difficult sales and transportation of complex tin-containing smelting intermediate materials and discount sales, and transform hazardous wastes into value-added valuable materials for comprehensive recovery.

In order to achieve the above purpose, the present disclosure adopts the following technical scheme:

A system for treating tin smelting intermediate materials, including: a fuming furnace, an electric settling furnace, a lean slag water quenching pool, a matte ladle, a pulverized coal injection system, a flue gas treatment system and a secondary air supply system;

the fuming furnace is connected with the electric settling furnace, the pulverized coal injection system, the flue gas treatment system and the secondary air supply system respectively;

the electric settling furnace is also connected with the slag-lean water quenching pool and the matte ladle respectively.

Preferably, further including: a belt feeding system and a hook scale system; wherein the tin smelting intermediate material comprises a hot tin slag, a tin-copper mineral material and a lump coal; the hot tin slag is fed into the fuming furnace through the hook scale system, and the tin-copper mineral material and the lump coal are fed into the fuming furnace through the belt feeding system.

Preferably, the fuming furnace is provided with a hot tin slag feed chute, a furnace top feed inlet and a high-temperature melt chute; the electric settling furnace is provided with a matte discharge chute and a lean slag discharge chute;

the hook scale system works in cooperation with the hot tin slag feeding chute; the belt feeding system works in cooperation with the furnace top feeding port; the high-temperature melt chute is communicated with a molten pool in the electric settling furnace;

the matte discharge chute is communicated with the interior of the matte ladle; the lean slag discharge chute is communicated with the interior of the slag-lean water quenching pool.

Preferably, the flue gas treatment system includes a dust collector, a tin electric furnace, a vacuum furnace, a top-blown converter, a vacuum tin chute, a vacuum tin mold, an antimony-bismuth alloy chute, an antimony-bismuth alloy mold and a high antimony-bismuth crude tin chute;

the dust collecting device is respectively communicated with the tin electric furnace and the top-blown converter;

the tin electric furnace is also communicated with the vacuum furnace through the high antimony-bismuth coarse tin chute; the vacuum tin mold is arranged at the end of the vacuum tin chute and used for receiving a vacuum tin; the antimony-bismuth alloy mold is arranged at the end of the antimony-bismuth alloy chute and used for receiving an antimony-bismuth alloy;

the top-blown converter is provided with a top-blown slag port and a top-blown converter coarse tin port; the hot tin slag transfer slag ladle is arranged under the top-blown slag port and used for receiving hot tin slag.

A method for treating intermediate materials for tin smelting by using the system is disclosed. The method includes the following steps:

(a) Preparation of fuming furnace materials: before the fuming furnace is ready for feeding, keeping the temperature of flue gas in the furnace at 600-800° C.;

(b) Receiving hot tin slag: lifting the hot tin slag transfer ladle through the hook scale system, introducing the hot tin slag into the fuming furnace through the hot tin slag feeding chute, and weighing and measuring the weight of the hot tin slag by the hook scale system;

(c) Top belt feeding: after the hot tin slag in the fuming furnace is received, starting the belt feeding system, adding a tin-copper mineral material and a lump coal into the fuming furnace, and finishing the feeding uniformly within 60-120 min;

(d) Heat up smelting: after the feeding of the belt system at the belt feeding system is finished, stopping the belt feeding system at the top of the fuming furnace, increasing the oxygen-enriched concentration of the secondary air supply system and the amount of pulverized coal supplied by the pulverized coal injection system, accelerating the heating and melting of cold materials in the fuming furnace, keeping the temperature of furnace flue gas at 1050-1150° C., controlling the Fe/SiO2 ratio of the first molten pool in the fuming furnace to 1.0-1.4, and keeping the temperature for 30-60 min;

(e) Fumigation and volatilization of tin: after heating, smelting and heat preservation until the cold material in the fuming furnace is completely melted, inserting the sample rod into the first molten pool inside the fuming furnace to take the melt sample for rapid elemental analysis, and starting the step of sulfurizing the volatile melt tin in the fuming furnace according to the results of rapid elemental analysis, adding a vulcanizing agent into the fuming furnace to volatilize tin through the belt feeding system, turning off an oxygen enrichment of the secondary air supply system synchronously, wherein the addition amount of the vulcanizing agent is calculated in accordance with the S/(Sn+Cu) molar ratio of 1:3 and the surplus coefficient is 1.2-1.3, and the addition of vulcanizing agent is completed within 90-120 min, taking a sample for analysis, the tin is volatilized when the tin content in the high-temperature melt in the fuming furnace is less than or equal to 0.3 wt. %;

(f) Separation of copper and lean slag in the electric settling furnace: when the electric settling furnace initially expects materials, using the slag with Fe/SiO2 ratio of 0.9-1.3 in the molten pool, and keeping the temperature of the molten pool in the electric settling furnace at 1200-1230° C.; discharging the high-temperature melt of the fuming furnace after the fuming and volatilizing tin reaches the standard into the electric settling furnace through a high-temperature melt chute in the step (e), keeping the electric settling furnace continuously heated until the copper content of the upper lean slag is less than or equal to 0.7 wt. %, then, burning the matte port at the low part of the sedimentation electric settling furnace firstly, discharging a matte in the electric settling furnace to the matte ladle through the matte discharge chute, and immediately plugging the matte outlet to stop matte discharge when the matte outlet has poor slag; discharging the lean slag in the electric settling furnace into the lean slag water quenching pool through the lean slag discharge chute at the upper part of the electric settling furnace for water quenching, the lean slag after water quenching can be sold out after slag-water separation; in the discharge of lean slag, using the sample rod to detect the depth of the molten bath in the electric settling furnace at all times, if the lean slag remains 300-500 mm in the molten pool, blocking the outlet of the lean slag, stopping the discharge of the lean slag, and using the remaining lean slag for heat preservation of the electric settling furnace so as to receive the high-temperature melt of the next furnace of the fuming furnace.

Preferably, in the step (c), the components of the tin-copper mineral material added into the fuming furnace are Sn 0-65 wt. %, Cu 0-24 wt. %, S 0-30 wt. %, Sb 0-20 wt. %, Bi 0-20 wt. %, As 0-7 wt. %, Au 0-30 g/t and Ag 0-800 g/t, the tin-copper mineral material is one or more of a tin-containing ore material, a copper-tin material and a high-sulfur copper concentrate; the main elements in the hot tin slag are Sn 2-6 wt. %, Fe 18-25 wt. % and Si 13-25 wt. %; the tin-containing ore material refers to the material containing only tin but not copper, the copper-tin material refers to the material containing both tin and copper, and the high-sulfur copper concentrate refers to the material containing only copper but not tin.

Preferably, the proportioning is performed according to the weight ratio of hot tin slag:tin-containing material: copper-tin material and high-sulfur copper concentrate of (30-70):(0-35):(0-20):(0-30), and the principle of proportioning is that the grade of Sn contained in the mixture is 3-10 wt. %, and the grade of Cu is not required to be controlled.

Preferably, the mass of the lump coal accounts for 3-5% of the tin smelting intermediate material.

Preferably, the vulcanizing agent is one or more of a sulfur, a pyrite or a high sulfur copper concentrate; in the step (e), according to the difference of tin smoke composition, when the antimony and bismuth content of tin smoke is higher than 5 wt. %, sending the high antimony-bismuth tin smoke to the tin electric furnace for reduction smelting to produce high antimony bismuth crude tin, and sending the high antimony bismuth crude tin to the vacuum furnace for refining to produce by-products antimony bismuth alloy and vacuum tin products, which can be sold directly; when the antimony and bismuth content of the tin dust is less than 5 wt. %, returning the low antimony bismuth tin dust directly to the main production process for reduction smelting in the top-blown converter.

Preferably, after the matte is wrapped with the high-temperature matte melt of the electric settling furnace in the step (f), cooling the matte ladle for 72-96 h, then solidifying the matte completely, and turning over the solidified matte in the matte ladle, wherein the upper layered material in the matte ladle is slag, and the lower layered material is qualified matte; sampling analysis of slag, if the copper content of slag is equal to or less than 0.7 wt. %, including the slag in the poor slag after water quenching for sale; if the copper content of slag is more than 0.7 wt. %, crushing the slag and returning to the electric settling furnace for melting and recovery of copper.

Compared with the prior art, the disclosure has the beneficial effects that: by adopting the existing mature sulfurization fuming technology and equipment, the separation and recovery of tin from other valuable elements in complex tin-containing materials with high efficiency and low cost are realized, tin is collected in the form of tin dust, and further treated by different main production process devices according to the difference of impurity content of tin dust; in addition, combined with the characteristics of various complex tin-containing materials, tin fuming needs sulfur, and takes advantage of the characteristics of matte to capture precious metals. In the fuming volatilization process, high-sulfur copper concentrate is added into the fuming furnace, which plays the above dual roles, not only fully utilizes the sulfur in copper concentrate, but also saves the purchasing cost of vulcanizing agent; after the tin in the high-temperature melt is fully fumed and volatilized, the remaining high-temperature melt containing copper and other precious metals is discharged into an electric settling furnace, and after the copper-containing melt and the upper slag are naturally settled, the silicon iron slag with low tin and low copper on the upper layer is separated, the lower layer is a matte layer rich in precious metals, the silicon iron slag with low tin and low copper on the upper layer is quenched by water and sold to cement plants for recycling, and the copper matte is discharged into the special steamed stuffed bun for cooling and sold after crushing. Therefore, the whole process of the disclosure does not produce any solid waste or hazardous waste, the tin material returns to the main production process without any economic loss, the technical process is simple and efficient, the recovery rate of valuable metals is high, and high-value full recovery can be realized.

BRIEF DESCRIPTION OF THE DRAWINGS

In order to more clearly explain the embodiments of the present disclosure or the technical solutions in the prior art, the following will briefly introduce the drawings that need to be used in the description of the embodiments or the prior art. Obviously, the drawings in the following description are only the embodiments of the present disclosure, and for ordinary technicians in the field, other drawings can be obtained according to the provided drawings without paying creative efforts.

In FIG. 1:
1—fuming furnace, 2—belt feeding system, 3—hook scale system, 4—hot tin slag feeding chute, 5—hot tin slag transfer slag ladle, 6—furnace top feeding port, 7—settling furnace, 8—poor slag water quenching pool, 9—matte ladle, 10—matte discharge chute, 11—poor slag discharge chute, 12—high temperature melt chute, 13—pulverized coal injection system, 14—dust collector, 18—vacuum tin chute, 19—vacuum tin mold, 20—antimony-bismuth alloy chute, 21—antimony-bismuth alloy mold, 22—high antimony-bismuth coarse tin chute, 23—top-blown slag port and 24 is top-blown converter coarse tin port.

DETAILED DESCRIPTION OF THE EMBODIMENTS

The technical solutions in the embodiments of the present disclosure will be described clearly and completely in the following, and it is obvious that the described embodiments are only a part of the embodiments of the present disclosure, but not all of the embodiments. Based on the embodiments of the present disclosure, all other embodiments obtained by the ordinary person skilled in the art without creative labor fall within the scope of protection of the present disclosure.

Embodiment 1

Figure 1:
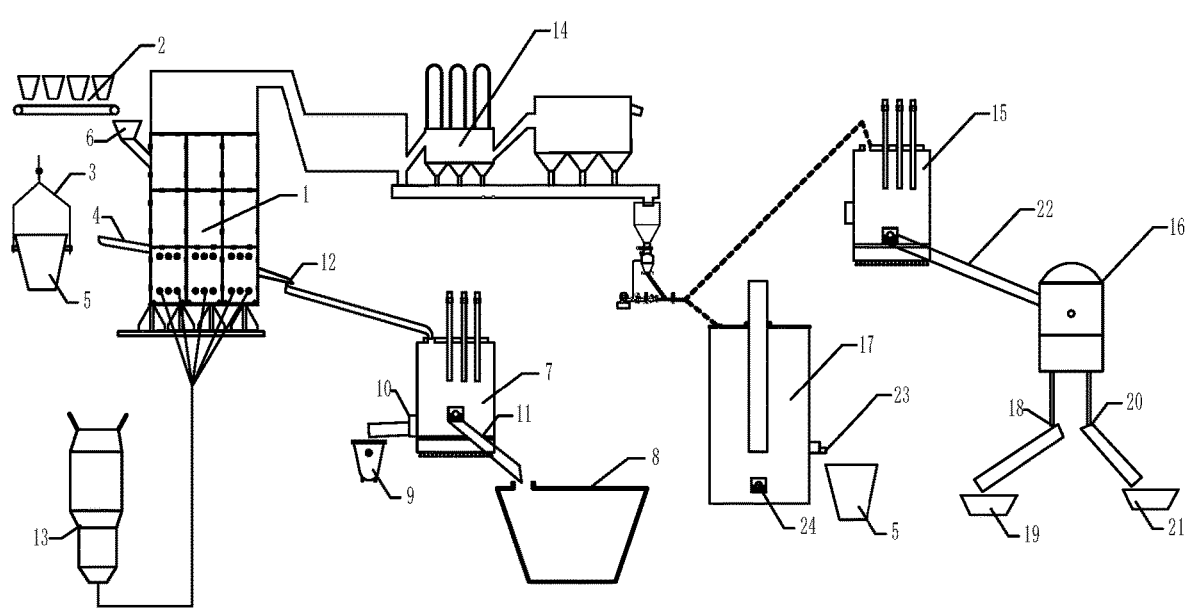
FIG. 1 is a schematic diagram of the system for treating tin smelting intermediate materials disclosed by the present disclosure.
Figure 2:
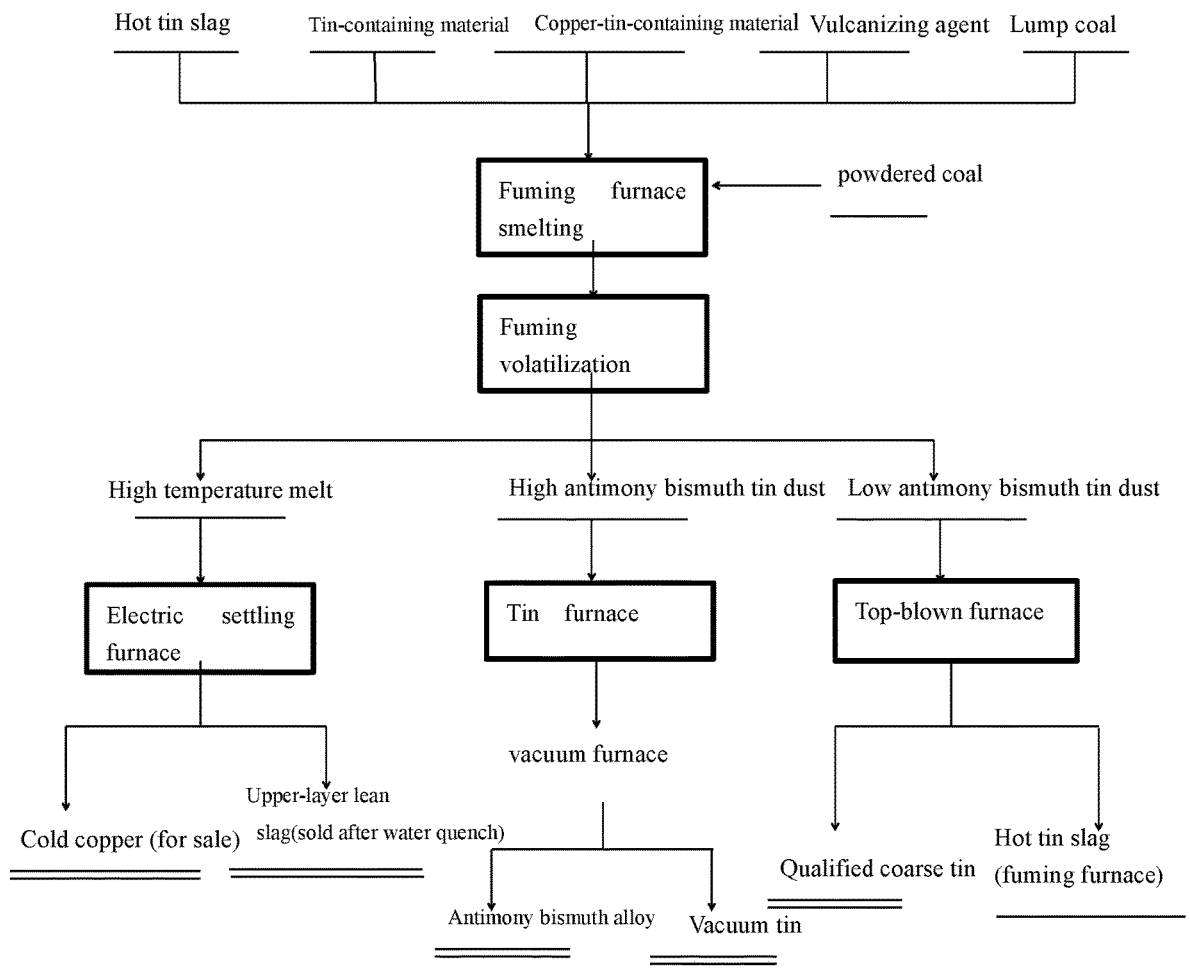
FIG. 2 is a process flow chart of the system for treating tin smelting intermediate materials disclosed by the present disclosure.

As shown in FIG. 1, this embodiment provides a system for treating tin smelting intermediate materials, including: a fuming furnace 1, an electric settling furnace 7, a lean slag water quenching pool 8, a matte ladle 9, a pulverized coal injection system 13, a flue gas treatment system and a secondary air supply system;

the fuming furnace 1 is connected with the electric settling furnace 7, the pulverized coal injection system 13, the flue gas treatment system and the secondary air supply system respectively;

the electric settling furnace 7 is also connected with the slag-lean water quenching pool 8 and the matte ladle 9 respectively.

a belt feeding system 2 and a hook scale system 3; wherein the tin smelting intermediate material includes a hot tin slag, a tin-copper mineral material and a lump coal; the hot tin slag is fed into the fuming furnace 1 through the hook scale system 3, and the tin-copper mineral materials and the lump coal are fed into the fuming furnace 1 through the belt feeding system 2.

the fuming furnace 1 is provided with a hot tin slag feed chute 4, a furnace top feed inlet 6 and a high-temperature melt chute 12; the electric settling furnace 7 is provided with a matte discharge chute 10 and a lean slag discharge chute 11;

the hook scale system 3 works in cooperation with the hot tin slag feeding chute 4; the belt feeding system 2 works in cooperation with the furnace top feeding port 6; the high-temperature melt chute 12 is communicated with a molten pool in the electric settling furnace 7;

the matte discharge chute 10 is communicated with the interior of the matte ladle 9; the lean slag discharge chute 11 is communicated with the interior of the slag-lean water quenching pool 8.

the flue gas treatment system includes a dust collector 14, a tin electric furnace 15, a vacuum furnace 16, a top-blown converter 17, a vacuum tin chute 18, a vacuum tin mold 19, an antimony-bismuth alloy chute 20, an antimony-bismuth alloy mold 21 and a high antimony-bismuth crude tin chute 22;

the dust collector 14 is respectively communicated with the tin electric furnace 15 and the top-blown converter 17;

the tin electric furnace 15 is also communicated with the vacuum furnace 22 through the high antimony-bismuth coarse tin chute 16; the vacuum tin mold 19 is arranged at the end of the vacuum tin chute 18 and used for receiving a vacuum tin; the antimony-bismuth alloy mold 21 is arranged at the end of the antimony-bismuth alloy chute 20 and used for receiving an antimony-bismuth alloy;

the top-blown converter 17 is provided with a top-blown slag port 23 and a top-blown converter coarse tin port 24; the hot tin slag transfer slag ladle 5 is arranged under the top-blown slag port 23 and used for receiving hot tin slag.

Embodiment 2

Using the system provided in embodiment 1, taking the fuming furnace for treating a high temperature melt amount of 100 tons as an example, the treatment method is as follows:

(a) Preparation of fuming furnace materials: before the fuming furnace is ready for feeding, keeping the temperature of flue gas in the furnace at 600° C.;

(b) Receiving hot tin slag: lifting the hot tin slag transfer ladle through the hook scale system, introducing the hot tin slag into the fuming furnace through the hot tin slag feeding chute, and weighing and measuring the weight of the hot tin slag by the hook scale system;

(c) Top belt feeding: after the hot tin slag in the fuming furnace is received, starting the belt feeding system, adding a tin-copper mineral material and a lump coal into the fuming furnace, and finishing the feeding uniformly within 60 min;

(d) Heat up smelting: after the feeding of the belt system at the belt feeding system is finished, stopping the belt feeding system at the top of the fuming furnace, increasing the oxygen-enriched concentration of the secondary air supply system and the amount of pulverized coal supplied by the pulverized coal injection system, accelerating the heating and melting of cold materials in the fuming furnace, keeping the temperature of furnace flue gas at 1050° C., controlling the Fe/SiO2 ratio of the first molten pool in the fuming furnace to 1.0, and keeping the temperature for 30 min;

(e) Fumigation and volatilization of tin: after heating, smelting and heat preservation until the cold material in the fuming furnace is completely melted, inserting the sample rod into the first molten pool inside the fuming furnace to take the melt sample for rapid elemental analysis, and starting the step of sulfurizing the volatile melt tin in the fuming furnace according to the results of rapid elemental analysis, adding a vulcanizing agent into the fuming furnace to volatilize tin through the belt feeding system, turning off an oxygen enrichment of the secondary air supply system synchronously, the results show that the melt contains 1.5 wt. % Sn and 0.75 wt. % Cu, wherein the addition amount of the vulcanizing agent is calculated in accordance with the S/(Sn+Cu) molar ratio of 1:3 and the surplus coefficient is 1.2, that is, the required S mass is 100 tons× 0.0097=0.97 tons, with industrial sulfur containing 99% S as vulcanizing agent, the amount of industrial sulfur needed to be added is 0.97 tons/99%=0.98 tons, and the addition of pyrite is completed within 90 min, taking a sample for analysis, the tin is volatilized when the tin content in the high-temperature melt in the fuming furnace is less than or equal to 0.3 wt. %.

(f) Separation of copper and lean slag in the electric settling furnace: when the electric settling furnace initially expects materials, using the slag with Fe/SiO2 ratio of 0.9 in the molten pool, and keeping the temperature of the molten pool in the electric settling furnace at 1200° C.; discharging the high-temperature melt of the fuming furnace after the fuming and volatilizing tin reaches the standard into the electric settling furnace through a high-temperature melt chute in the step (e), keeping the electric settling furnace continuously heated until the copper content of the upper lean slag is less than or equal to 0.7 wt. %, then, burning the matte port at the low part of the sedimentation electric settling furnace firstly, discharging the matte in the electric settling furnace to the matte ladle through the matte discharge chute, and immediately plugging the matte outlet to stop matte discharge when the matte outlet has poor slag; discharging the lean slag in the electric settling furnace into the lean slag water quenching pool through the lean slag discharge chute at the upper part of the electric settling furnace for water quenching, the lean slag after water quenching can be sold out after slag-water separation; in the discharge of lean slag, using the sample rod to detect the depth of the molten bath in the electric settling furnace at all times, if the lean slag remains 300 mm in the molten pool, blocking the outlet of the lean slag, stopping the discharge of the lean slag, and using the remaining lean slag for heat preservation of the electric settling furnace so as to receive the high-temperature melt of the next furnace of the fuming furnace.

In the above step (c), the tin-containing materials are added into the fuming furnace with the components of Sn 3 wt. %, Cu 0 wt. %, S 7 wt. %, Sb 0 wt. %, Bi 0 wt. %, As 0 wt. %, Au 0 g/t and Ag 0 g/t, and the copper-tin materials are Sn 65 wt. %, Cu18 wt. % and S10. Bi 0 wt. %, As 1.0 wt. %, Au 0 g/t, Ag 8 g/t, high-sulfur copper concentrate consists of Sn 0 wt. %, Cu 15 wt. %, S 28 wt. %, Sb 0 wt. %, Bi 0 wt. %, As 0 wt. %, Au 2 g/t, Ag 150 g/t; the main elements of the hot tin slag are Sn 2 wt. %, Fe 18 wt. % and Si 13 wt. %.

In the above step (c), mixed tin-containing ore materials, copper-tin materials and high-sulfur copper concentrate are added into the fuming furnace for proportioning control, and according to the weight of hot tin slag weighed and measured by the hook scale in step (b), the proportioning is performed according to the weight ratio of hot tin slag:tin-containing material:copper-tin material and high-sulfur copper concentrate of 48%:27%:12%:13%, and the principle of proportioning is that the grade of Sn contained in the mixture is 10 wt. %, and the grade of Cu is 3.97 wt. %; the lump coal accounts for 3% of intermediate materials in tin smelting;

fuming and volatilizing the tin dust in the step (e), when the antimony and bismuth content of the tin dust is less than 5 wt. %, returning the low antimony bismuth tin dust directly to the main production process for reduction smelting in the top-blown converter;

after the matte is wrapped with the high-temperature matte melt of the electric settling furnace in the step (f), cooling the matte ladle for 72 h, then solidifying the matte completely, and turning over the solidified matte in the matte ladle, wherein the upper layered material in the matte ladle is slag, and the lower layered material is qualified matte; sampling analysis of slag, if the copper content of slag is equal to or less than 0.7 wt. %, the slag will be merged into water quenched lean slag and sold to cement plant; crushing the slag and returning to the electric settling furnace for melting and recovery of copper.

In the embodiment 2, that direct yield of the synthesized material containing Sn is 95%, and 22 wt. % grade of matte is obtained, the direct yield of Cu is 94%, the direct yield of Au and Ag collected by matte is 96%, and no hazardous waste material is generated.

Embodiment 3

Using the system provided in embodiment 1, taking the fuming furnace for treating a high temperature melt amount of 120 tons as an example, the treatment method is as follows:

(a) Preparation of fuming furnace materials: before the fuming furnace is ready for feeding, keeping the temperature of flue gas in the furnace at 700° C.;

(b) Receiving hot tin slag: lifting the hot tin slag transfer ladle through the hook scale system, introducing the hot tin slag into the fuming furnace through the hot tin slag feeding chute, and weighing and measuring the weight of the hot tin slag by the hook scale system;

(c) Top belt feeding: after the hot tin slag in the fuming furnace is received, starting the belt feeding system, adding a tin-copper mineral material and a lump coal into the fuming furnace, and finishing the feeding uniformly within 70 min;

(d) Heat up smelting: after the feeding of the belt system at the belt feeding system is finished, stopping the belt feeding system at the top of the fuming furnace, increasing the oxygen-enriched concentration of the secondary air supply system and the amount of pulverized coal supplied by the pulverized coal injection system, accelerating the heating and melting of cold materials in the fuming furnace, keeping the temperature of furnace flue gas at 1100° C., controlling the Fe/SiO2 ratio of the first molten pool in the fuming furnace to 1.1, and keeping the temperature for 40 min;

(e) Fumigation and volatilization of tin: after heating, smelting and heat preservation until the cold material in the fuming furnace is completely melted, inserting the sample rod into the first molten pool inside the fuming furnace to take the melt sample for rapid elemental analysis, and starting the step of sulfurizing the volatile melt tin in the fuming furnace according to the results of rapid elemental analysis, adding a vulcanizing agent into the fuming furnace to volatilize tin through the belt feeding system, turning off an oxygen enrichment of the secondary air supply system synchronously, the results show that the melt contains 1 wt. % Sn and 0.85 wt. % Cu, wherein the addition amount of the vulcanizing agent is calculated in accordance with the S/(Sn+Cu) molar ratio of 1:3 and the surplus coefficient is 1.2, that is, the required S mass is 120 tons× 0.0087=1.044 tons, the pyrite containing 35% S is used as vulcanizing agent, the amount of pyrite needed to be added is 1.044 tons/35%=2.98 tons, and the addition of pyrite is completed within 90 min, taking a sample for analysis, the tin is volatilized when the tin content in the high-temperature melt in the fuming furnace is less than or equal to 0.3 wt. %.

(f) Separation of copper and lean slag in the electric settling furnace: when the electric settling furnace initially expects materials, using the slag with Fe/SiO2 ratio of 1.0 in the molten pool, and keeping the temperature of the molten pool in the electric settling furnace at 1210° C.; discharging the high-temperature melt of the fuming furnace after the fuming and volatilizing tin reaches the standard into the electric settling furnace through a high-temperature melt chute in the step (e), keeping the electric settling furnace continuously heated until the copper content of the upper lean slag is less than or equal to 0.7 wt. %, then, burning the matte port at the low part of the sedimentation electric settling furnace firstly, discharging the matte in the electric settling furnace to the matte ladle through the matte discharge chute, and immediately plugging the matte outlet to stop matte discharge when the matte outlet has poor slag; discharging the lean slag in the electric settling furnace into the lean slag water quenching pool through the lean slag discharge chute at the upper part of the electric settling furnace for water quenching, the lean slag after water quenching can be sold out after slag-water separation; in the discharge of lean slag, using the sample rod to detect the depth of the molten bath in the electric settling furnace at all times, if the lean slag remains 400 mm in the molten pool, blocking the outlet of the lean slag, stopping the discharge of the lean slag, and using the remaining lean slag for heat preservation of the electric settling furnace so as to receive the high-temperature melt of the next furnace of the fuming furnace.

In the above step (c), the tin-containing materials are added into the fuming furnace with the components of Sn 5 wt. %, Cu 0 wt. %, S 0 wt. %, Sb 0 wt. %, Bi 0 wt. %, As 0 wt. %, Au 0 g/t, Ag 0 g/t and the copper-tin materials are Sn 60 wt. %, Cu15 wt. %, S 8 wt. %, Sb 0 wt. %, Bi 0 wt. %, As 1.5 wt. %, Au 0 g/t, Ag10 g/t, high-sulfur copper concentrate consists of Sn 0 wt. %, Cu 12 wt. %, S 30 wt. % and Sb 0 wt. %; the main elements of the hot tin slag are Sn 3 wt. %, Fe 25 wt. % and Si 25 wt. %.

In the above step (c), mixed tin-containing ore materials, copper-tin materials and high-sulfur copper concentrate are added into the fuming furnace for proportioning control, and according to the weight of hot tin slag weighed and measured by the hook scale in step (b), the proportioning is performed according to the weight ratio of hot tin slag:tin-containing material:copper-tin material and high-sulfur copper concentrate of 70%:10%:10%:10%, and the principle of proportioning is that the grade of Sn contained in the mixture is 8.6 wt. %, and the grade of Cu is 2.7 wt. %; the lump coal accounts for 5% of intermediate materials in tin smelting;

fuming and volatilizing the tin dust in the step (e), when the antimony and bismuth content of the tin dust is less than 5 wt. %, returning the low antimony bismuth tin dust directly to the main production process for reduction smelting in the top-blown converter;

after the matte is wrapped with the high-temperature matte melt of the electric settling furnace in the step (f), cooling the matte ladle for 72 h, then solidifying the matte completely, and turning over the solidified matte in the matte ladle, wherein the upper layered material in the matte ladle is slag, and the lower layered material is qualified matte; sampling analysis of slag, if the copper content of slag is equal to or less than 0.7 wt. %, the slag will be merged into water quenched lean slag and sold to cement plant; crushing the slag and returning to the electric settling furnace for melting and recovery of copper.

In the embodiment 2, that direct yield of the synthesized material containing Sn is 96%, and 18 wt. % grade of matte is obtained, the direct yield of Cu is 92%, the direct yield of Au and Ag collected by matte is 95%, and no hazardous waste material is generated.

Embodiment 4

Using the system provided in embodiment 1, taking the fuming furnace for treating a high temperature melt amount of 80 tons as an example, the treatment method is as follows:

(a) Preparation of fuming furnace materials: before the fuming furnace is ready for feeding, keeping the temperature of flue gas in the furnace at 800° C.;

(b) Receiving hot tin slag: lifting the hot tin slag transfer ladle through the hook scale system, introducing the hot tin slag into the fuming furnace through the hot tin slag feeding chute, and weighing and measuring the weight of the hot tin slag by the hook scale system;

(c) Top belt feeding: after the hot tin slag in the fuming furnace is received, starting the belt feeding system, adding a tin-copper mineral material and a lump coal into the fuming furnace, and finishing the feeding uniformly within 90 min;

(d) Heat up smelting: after the feeding of the belt system at the belt feeding system is finished, stopping the belt feeding system at the top of the fuming furnace, increasing the oxygen-enriched concentration of the secondary air supply system and the amount of pulverized coal supplied by the pulverized coal injection system, accelerating the heating and melting of cold materials in the fuming furnace, keeping the temperature of furnace flue gas at 1150° C., controlling the Fe/SiO2 ratio of the first molten pool in the fuming furnace to 1.3, and keeping the temperature for 50 min;

(e) Fumigation and volatilization of tin: after heating, smelting and heat preservation until the cold material in the fuming furnace is completely melted, inserting the sample rod into the first molten pool inside the fuming furnace to take the melt sample for rapid elemental analysis, according to the results of rapid elemental analysis, because the molar ratio of S/(Sn+Cu) in the high-temperature melt is more than 1:3, the analysis results show that the tin content in the high-temperature melt is 0.24 wt. %, that is, the tin volatilization operation of the high-temperature melt in this fuming furnace has reached the end point, and there is no need to add vulcanizing agent.

(f) Separation of copper and lean slag in the electric settling furnace: when the electric settling furnace initially expects materials, using the slag with Fe/SiO2 ratio of 1.2 in the second molten pool, and keeping the temperature of the second molten pool in the electric settling furnace at 1220° C.; discharging the high-temperature melt of the fuming furnace after the fuming and volatilizing tin reaches the standard into the electric settling furnace through a high-temperature melt chute in the step (e), keeping the electric settling furnace continuously heated until the copper content of the upper lean slag is less than or equal to 0.7 wt. %, then, burning the matte port at the low part of the sedimentation electric settling furnace firstly, discharging the matte in the electric settling furnace to the matte ladle through the matte discharge chute, and immediately plugging the matte outlet to stop matte discharge when the matte outlet has poor slag; discharging the lean slag in the electric settling furnace into the lean slag water quenching pool through the lean slag discharge chute at the upper part of the electric settling furnace for water quenching, the lean slag after water quenching can be sold out after slag-water separation; in the discharge of lean slag, using the sample rod to detect the depth of the molten bath in the electric settling furnace at all times, if the lean slag remains 500 mm in the second molten pool, blocking the outlet of the lean slag, stopping the discharge of the lean slag, and using the remaining lean slag for heat preservation of the electric settling furnace so as to receive the high-temperature melt of the next furnace of the fuming furnace.

In the above step (c), the tin-containing materials are added into the fuming furnace with the components of Sn 3 wt. %, Cu 0 wt. %, S 0 wt. %, Sb 0 wt. %, Bi 0 wt. %, As 0 wt. %, Au 0 g/t, Ag 0 g/t and the copper-tin materials are Sn 35 wt. %, Cu1.5 wt. %, S 0 wt. %, Sb 0 wt. %, Bi 0 wt. %, As 2 wt. %, Au 0 g/t, Ag150 g/t, high-sulfur copper concentrate consists of Sn 0 wt. %, Cu 18 wt. %, S 30 wt. % and Sb 0 wt. %, Bi 0 wt. %, As 2 wt. %, Au 0 g/t, Ag 150 g/t; the main elements of the hot tin slag are Sn 5 wt. %, Fe 18 wt. % and Si 13 wt. %;

In the above step (c), mixed tin-containing ore materials, copper-tin materials and high-sulfur copper concentrate are added into the fuming furnace for proportioning control, and according to the weight of hot tin slag weighed and measured by the hook scale in step (b), the proportioning is performed according to the weight ratio of hot tin slag:tin-containing material:copper-tin material and high-sulfur copper concentrate of 47%:27%:20%:6%, and the principle of proportioning is that the grade of Sn contained in the mixture is 10 wt. %, and the grade of Cu is 1.3 wt. %; the lump coal accounts for 4% of intermediate materials in tin smelting;

fuming and volatilizing the tin dust in the step (e), when the antimony and bismuth content of the tin dust is less than 5 wt. %, returning the low antimony bismuth tin dust directly to the main production process for reduction smelting in the top-blown converter;

after the matte is wrapped with the high-temperature matte melt of the electric settling furnace in the step (f), cooling the matte ladle for 96 h, then solidifying the matte completely, and turning over the solidified matte in the matte ladle, wherein the upper layered material in the matte ladle is slag, and the lower layered material is qualified matte; sampling analysis of slag, if the copper content of slag is equal to or less than 0.7 wt. %, the slag will be merged into water quenched lean slag and sold to cement plant; crushing the slag and returning to the electric settling furnace for melting and recovery of copper.

In the embodiment 4, that direct yield of the synthesized material containing Sn is 96.5%, and completely solidifying matte, turning the solidified matte into matte ladle, the direct yield of Cu is 96%, the direct yield of Au and Ag collected by matte is 96.5%, and no hazardous waste material is generated.

Embodiment 5

Using the system provided in embodiment 1, taking the fuming furnace for treating a high temperature melt amount of 100 tons as an example, the treatment method is as follows:

(a) Preparation of fuming furnace materials: before the fuming furnace is ready for feeding, keeping the temperature of flue gas in the furnace at 800° C.;

(b) Receiving hot tin slag: lifting the hot tin slag transfer ladle through the hook scale system, introducing the hot tin slag into the fuming furnace through the hot tin slag feeding chute, and weighing and measuring the weight of the hot tin slag by the hook scale system;

(c) Top belt feeding: after the hot tin slag in the fuming furnace is received, starting the belt feeding system, adding a tin-copper mineral material and lump coal into the fuming furnace, and finishing the feeding uniformly within 120 min;

(d) Heat up smelting: after the feeding of the belt system at the belt feeding system is finished, stopping the belt feeding system at the top of the fuming furnace, increasing the oxygen-enriched concentration of the secondary air supply system and the amount of pulverized coal supplied by the pulverized coal injection system, accelerating the heating and melting of cold materials in the fuming furnace, keeping the temperature of furnace flue gas at 1150° C., controlling the Fe/SiO2 ratio of the first molten pool in the fuming furnace to 1.4, and keeping the temperature for 60 min;

(e) Fumigation and volatilization of tin: after heating, smelting and heat preservation until the cold material in the fuming furnace is completely melted, inserting the sample rod into the first molten pool inside the fuming furnace to take the melt sample for rapid elemental analysis, according to the results of rapid elemental analysis, because the molar ratio of S/(Sn+Cu) in the high-temperature melt is more than 1:3, the analysis results show that the tin content in the high-temperature melt is 0.22 wt. %, that is, the tin volatilization operation of the high-temperature melt in this fuming furnace has reached the end point, and there is no need to add vulcanizing agent.

(f) Separation of copper and lean slag in the electric settling furnace: when the electric settling furnace initially expects materials, using the slag with Fe/SiO2 ratio of 1.3 in the second molten pool, and keeping the temperature of the second molten pool in the electric settling furnace at 1230° C.; discharging the high-temperature melt of the fuming furnace after the fuming and volatilizing tin reaches the standard into the electric settling furnace through a high-temperature melt chute in the step (e), keeping the electric settling furnace continuously heated until the copper content of the upper lean slag is less than or equal to 0.7 wt. %, then, burning the matte port at the low part of the sedimentation electric settling furnace firstly, discharging a matte in the electric settling furnace to the matte ladle through the matte discharge chute, and immediately plugging the matte outlet to stop matte discharge when the matte outlet has poor slag; discharging the lean slag in the electric settling furnace into the lean slag water quenching pool through the lean slag discharge chute at the upper part of the electric settling furnace for water quenching, the lean slag after water quenching can be sold out after slag-water separation; in the discharge of lean slag, using the sample rod to detect the depth of the molten bath in the electric settling furnace at all times, if the lean slag remains 500 mm in the second molten pool, blocking the outlet of the lean slag, stopping the discharge of the lean slag, and using the remaining lean slag for heat preservation of the electric settling furnace so as to receive the high-temperature melt of the next furnace of the fuming furnace.

In the above step (c), the tin-containing materials are added into the fuming furnace with the components of Sn 3 wt. %, Cu 0 wt. %, S 0 wt. %, Sb 0 wt. %, Bi 0 wt. %, As 0 wt. %, Au 0 g/t, Ag 0 g/t and the copper-tin materials are Sn 35 wt. %, Cu 1.5 wt. %, S 0 wt. %, Sb 20 wt. %, Bi 20 wt. %, As 7.0 wt. %, Au 30 g/t, Ag150 g/t, high-sulfur copper concentrate consists of Sn 0 wt. %, Cu 24 wt. %, S 30 wt. % and Sb 0 wt. %, Bi 0 wt. %, As 2 wt. %, Au 0 g/t, Ag 150 g/t; the main elements of the hot tin slag are Sn 3 wt. %, Fe 25 wt. % and Si 25 wt. %;

In the above step (c), mixed tin-containing ore materials, copper-tin materials and high-sulfur copper concentrate are added into the fuming furnace for proportioning control, and according to the weight of hot tin slag weighed and measured by the hook scale in step (b), the proportioning is performed according to the weight ratio of hot tin slag:tin-containing material:copper-tin material and high-sulfur copper concentrate of 33.5%:33.5%:3%:30%, and the principle of proportioning is that the grade of Sn contained in the mixture is 3 wt. %, and the grade of Cu is 7.35 wt. %; the lump coal accounts for 4% of intermediate materials in tin smelting.

fuming and volatilizing the tin dust in the step (e), when the antimony and bismuth content of the tin dust is less than 5 wt. %, returning the low antimony bismuth tin dust directly to the main production process for reduction smelting in the top-blown converter;

after the matte is wrapped with the high-temperature matte melt of the electric settling furnace in the step (f), cooling the matte ladle for 96 h, then solidifying the matte completely, and turning over the solidified matte in the matte ladle, wherein the upper layered material in the matte ladle is slag, and the lower layered material is qualified matte; sampling analysis of slag, if the copper content of slag is equal to or less than 0.7 wt. %, the slag will be merged into water quenched lean slag and sold to cement plant; crushing the slag and returning to the electric settling furnace for melting and recovery of copper.

In the embodiment 5, the direct yield of the synthesized material containing Sn is 97%, and 28 wt. % grade matte is obtained; turning the solidified matte into matte ladle, the direct yield of Cu is 98%, the direct yield of Au and Ag collected by matte is 97.5%, and no hazardous waste material is generated.

Embodiment 6

Using the system provided in embodiment 1, taking the fuming furnace for treating a high temperature melt amount of 120 tons as an example, the treatment method is as follows:
(a) Preparation of fuming furnace materials: before the fuming furnace is ready for feeding, keeping the temperature of flue gas in the furnace at 800° C.;
(b) Receiving hot tin slag: lifting the hot tin slag transfer ladle through the hook scale system, introducing the hot tin slag into the fuming furnace through the hot tin slag feeding chute, and weighing and measuring the weight of the hot tin slag by the hook scale system;
(c) Top belt feeding: after the hot tin slag in the fuming furnace is received, starting the belt feeding system, adding a tin-copper mineral material and lump coal into the fuming furnace, and finishing the feeding uniformly within 120 min;
(d) Heat up smelting: after the feeding of the belt system at the belt feeding system is finished, stopping the belt feeding system at the top of the fuming furnace, increasing the oxygen-enriched concentration of the secondary air supply system and the amount of pulverized coal supplied by the pulverized coal injection system, accelerating the heating and melting of cold materials in the fuming furnace, keeping the temperature of furnace flue gas at 1150° C., controlling the Fe/SiO2 ratio of the first molten pool in the fuming furnace to 1.4, and keeping the temperature for 60 min;
(e) Fumigation and volatilization of tin: after heating, smelting and heat preservation until the cold material in the fuming furnace is completely melted, inserting the sample rod into the first molten pool inside the fuming furnace to take the melt sample for rapid elemental analysis, and starting the step of sulfurizing the volatile melt tin in the fuming furnace according to the results of rapid elemental analysis, adding a vulcanizing agent into the fuming furnace to volatilize tin through the belt feeding system, turning off an oxygen enrichment of the secondary air supply system synchronously, the results show that the melt contains 2.5 wt. % Sn and 0.65 wt. % Cu, wherein the addition amount of the vulcanizing agent is calculated in accordance with the S/(Sn+Cu) molar ratio of 1:3 and the surplus coefficient is 1.2, that is, the required S mass is 120 tons× 0.0125=1.5 tons, and Pyrite containing 35% S is used as vulcanizing agent, the amount of Pyrite needed to be added is 1.5 tons/35%=4.28 tons, and the addition of pyrite is completed within 90 min, taking a sample for analysis, the tin is volatilized when the tin content in the high-temperature melt in the fuming furnace is less than or equal to 0.3 wt. %.
(f) Separation of copper and lean slag in the electric settling furnace: when the electric settling furnace initially expects materials, using the slag with Fe/SiO2 ratio of 1.3 in the molten pool, and keeping the temperature of the molten pool in the electric settling furnace at 1230° C.; discharging the high-temperature melt of the fuming furnace after the fuming and volatilizing tin reaches the standard into the electric settling furnace through a high-temperature melt chute in the step (e), keeping the electric settling furnace continuously heated until the copper content of the upper lean slag is less than or equal to 0.7 wt. %, then, burning the matte port at the low part of the sedimentation electric settling furnace firstly, discharging the matte in the electric settling furnace to the matte ladle through the matte discharge chute, and immediately plugging the matte outlet to stop matte discharge when the matte outlet has poor slag; discharging the lean slag in the electric settling furnace into the lean slag water quenching pool through the lean slag discharge chute at the upper part of the electric settling furnace for water quenching, the lean slag after water quenching can be sold out after slag-water separation; in the discharge of lean slag, using the sample rod to detect the depth of the second molten pool in the electric settling furnace at all times, if the lean slag remains 500 mm in the molten pool, blocking the outlet of the lean slag, stopping the discharge of the lean slag, and using the remaining lean slag for heat preservation of the electric settling furnace so as to receive the high-temperature melt of the next furnace of the fuming furnace.

In the above step (c), the tin-containing materials are added into the fuming furnace with the components of Sn 3 wt. %, Cu 0 wt. %, S 0 wt. %, Sb 0 wt. %, Bi 0 wt. %, As 0 wt. %, Au 0 g/t, Ag 0 g/t and the copper-tin materials are Sn 65 wt. %, Cu 18 wt. %, S 10 wt. %, Sb 0 wt. %, Bi 0 wt. %, As 0 wt. %, Au 5 g/t, Ag 350 g/t, high-sulfur copper concentrate consists of Sn 0 wt. %, Cu 24 wt. %, S 28 wt. %, Sb 0 wt. %, Bi 0 wt. %, As 2 wt. %, Au 0 g/t and Ag 150 g/t; the main elements of the hot tin slag are Sn 3.5 wt. %, Fe 26 wt. % and Si 24 wt. %;

In the above step (c), mixed tin-containing ore materials, copper-tin materials and high-sulfur copper concentrate are added into the fuming furnace for proportioning control, and according to the weight of hot tin slag weighed and measured by the hook scale in step (b), the proportioning is performed according to the weight ratio of hot tin slag:tin-containing material:copper-tin material and high-sulfur copper concentrate of 48.3%:27.6%:11.5%:12.6%, and the principle of proportioning is that the grade of Sn contained in the mixture is 9.99 wt. %, and the grade of Cu is 5.10 wt. %; the lump coal accounts for 3% of intermediate materials in tin smelting;

fuming and volatilizing the tin dust in the step (e), when the antimony and bismuth content of the tin dust is less than 5 wt. %, returning the low antimony bismuth tin dust directly to the main production process for reduction smelting in the top-blown converter.

after the matte is wrapped with the high-temperature matte melt of the electric settling furnace in the step (f), cooling the matte ladle for 96 h, then solidifying the matte completely, and turning over the solidified matte in the matte ladle, wherein the upper layered material in the matte ladle is slag, and the lower layered material is qualified matte; sampling analysis of slag, if the copper content of slag is equal to or less than 0.7 wt. %, the slag will be merged into water quenched lean slag and sold to cement plant; crushing the slag and returning to the electric settling furnace for melting and recovery of copper.

In the embodiment 5, that direct yield of the synthesized material containing Sn is 97%, and 24 wt. % grade matte is obtained, turning the solidified matte into matte ladle, the direct yield of Cu is 98.5%, the direct yield of Au and Ag collected by matte is greater than 97%, and no hazardous waste material is generated.

In this specification, each embodiment is described in a progressive way, and each embodiment focuses on the differences from other embodiments, so it is enough to refer to the same and similar parts between each embodiment. For the device disclosed in the embodiment, because it corresponds to the method disclosed in the embodiment, the description is relatively simple, and refer to the description of the method section for relevant information.

The above description of the disclosed embodiments enables those skilled in the art to realize or use the present disclosure. Many modifications to these embodiments will be obvious to those skilled in the art, and the general principles defined herein can be implemented in other embodiments without departing from the spirit or scope of the present disclosure. Therefore, the present disclosure will not be limited to the embodiments shown herein, but should be accorded the widest scope consistent with the principles and novel features disclosed herein.

What is claimed is:

1. A method for treating tin smelting intermediate materials by using a system,
    wherein the system comprises: a fuming furnace, an electric settling furnace, a lean slag water quenching pool, a matte ladle, a pulverized coal injection system, and a flue gas treatment system;
    wherein the fuming furnace is connected with the electric settling furnace, the pulverized coal injection system, and the flue gas treatment system,
    wherein the electric settling furnace is connected with the lean slag water quenching pool and the matte ladle,
    wherein the method comprises:
    (a) before feeding hot tin slag into the fuming furnace, maintaining a temperature of flue gas in the fuming furnace at 600-800° C.;
    (b) lifting a hot tin slag transfer ladle through a hook scale system, introducing the hot tin slag in the hot tin slag transfer ladle into the fuming furnace through a hot tin slag feeding chute disposed on the fuming furnace; wherein before being placed on the slag feeding chute, a weight of the hot tin slag is measured by the hook scale system;
    (c) after the hot tin slag is introduced into the fuming furnace through the hot tin slag feeding chute, turning on a belt feeding system, uniformly adding a tin-copper mineral material and lump coal into the fuming furnace within 60-120 min through the belt feeding system;
    (d) after the tin-copper mineral material and the lump coal are completely added into the fuming furnace, turning off the belt feeding system, and increasing an amount of pulverized coal blowing into the fuming furnace by the pulverized coal injection system; heating and melting the hot tin slag, the tin-copper mineral material and the lump coal in the fuming furnace; controlling a $Fe/SiO_2$ ratio of a first molten pool to 1.0-1.4, and keeping the temperature of the flue gas at 1050-1150° C. for 30-60 min to completely melt the hot tin slag, the tin-copper mineral material and the lump coal in the first molten pool in the fuming furnace to obtain high-temperature melt; wherein the first molten pool is formed in the fuming furnace and is formed by melting first slag containing Fe and $SiO_2$;

(e) inserting a sample rod into the high-temperature melt in the first molten pool to take a first melt sample for a first elemental analysis to obtain a Sn content and a Cu content; adding a vulcanizing agent, through the belt feeding system, into the fuming furnace to volatilize melt tin in the high-temperature melt within 90-120 min according to a S/(Sn+Cu) molar ratio of 1:3 and a surplus coefficient of 1.2-1.3; taking a second melt sample for a second elemental analysis; when a tin content in the second melt sample is not greater than 0.3 wt. %, determining that the melt tin in the fuming furnace has volatilized; and when the tin content in the second melt sample is greater than 0.3 wt. %, adding an extra vulcanizing agent into the fuming furnace until the tin content in a final melt sample is not greater than 0.3 wt. %; wherein an addition amount of the vulcanizing agent is determined in accordance with the S/(Sn+Cu) molar ratio of 1:3, and surplus coefficient is 1.2-1.3;

(f) before discharging the high-temperature melt in the fuming furnace into the electric settling furnace, melting second slag with Fe/SiO2 ratio of 0.9-1.3 in the electric settling furnace to form a second molten pool, and keeping a temperature of the second molten pool in the electric settling furnace at 1200-1230° C.; discharging the high-temperature melt with the tin content not greater than 0.3 wt. % into the electric settling furnace through a high-temperature melt chute disposed on the electric settling furnace, obtaining matte by keeping the electric settling furnace continuously heated until a copper content of upper lean slag therein is not greater than 0.7 wt. %, opening a matte port disposed on a low part of the electric settling furnace, discharging the matte in the electric settling furnace to the matte ladle through a matte discharge chute communicated with the matte port, and immediately sealing the matte port when the matte is completely discharged and the upper lean slag is tended to flow out of the matte port; discharging the upper lean slag in the electric settling furnace into the lean slag water quenching pool through a lean slag discharge chute at an upper part of the electric settling furnace for water quenching, removing water in lean slag after water quenching to obtain dried lean slag;

wherein during a discharging process of the upper lean slag, the sample rod is configured to detect a depth of the upper lean slag in the electric settling furnace, when the depth of the upper lean slag is 300-500 mm, sealing an outlet communicated with the lean slag discharge chute and using remaining upper lean slag for keeping a temperature in the electric settling furnace so as to receive next high-temperature melt discharged by the fuming furnace.

2. The method of claim 1, wherein in the step (c), components of the tin-copper mineral material added into the fuming furnace comprise Sn 0-65 wt. %, Cu 0-24 wt. %, S 0-30 wt. %, Sb 0-20 wt. %, Bi 0-20 wt. %, As 0-7 wt. %, Au 0-30 g/t and Ag 0-800 g/t, the tin-copper mineral material is one or more of a tin-containing mineral material, a copper-tin material and a high-sulfur copper concentrate; and main elements in the hot tin slag are Sn 2-6 wt. %, Fe 18-25 wt. % and Si 13-25 wt. %.

3. The method of claim 2, wherein the tin-copper mineral material comprises the tin-containing mineral material, the copper-tin material and the high-sulfur copper concentrate, a weight ratio of the hot tin slag:the tin-containing mineral material:the copper-tin material and the high-sulfur copper concentrate is (30-70):(0-35):(0-20):(0-30), and a grade of Sn contained in the tin-copper mineral material is 3-10 wt. %.

4. The method of claim 1, wherein the mass of the lump coal accounts for 3-5% of a total mass of the hot tin slag, the tin-copper mineral material, and the lump coal.

5. The method of claim 1, wherein the vulcanizing agent is one or more of a sulfur, a pyrite or a high sulfur copper concentrate; in the step (e), the melt tin is volatilized to obtain tin smoke, wherein when a antimony and bismuth content of the tin smoke is greater than 5 wt. %, the tin smoke is transported to a tin electric furnace for reduction smelting to produce high antimony bismuth crude tin, and the high antimony bismuth crude tin is transported to a vacuum furnace for refining to produce antimony bismuth alloy and vacuum tin products, or when the antimony and bismuth content of the tin smoke is less than 5 wt. %, the tin smoke is transported to a top-blown converter for reduction smelting.

6. The method of claim 1, wherein in the step (f), after the matte is collected in the matte ladle, the matte ladle is cooled for 72-96 hours, the matte is then completely solidified, and solidified matte is turned over in the matte ladle, wherein an upper layer of the solidified matte is third slag, a lower layer of the solidified matte is qualified matte, the third slag is sampled and analyzed to obtain a copper content of the third slag, when the copper content of third slag is not greater than 0.7 wt. %, the third slag is mixed with the dried lean slag, or when the copper content of the third slag is greater than 0.7 wt. %, the third slag is crushed and added into the electric settling furnace for melting and recovery of copper.

* * * * *